United States Patent [19]
Molitorisz

[11] Patent Number: 5,070,779
[45] Date of Patent: Dec. 10, 1991

[54] TYING MECHANISM

[76] Inventor: Joseph Molitorisz, 15326 SE. 43rd Pl., Bellevue, Wash. 98006

[21] Appl. No.: 487,257

[22] Filed: Mar. 2, 1990

[51] Int. Cl.⁵ .............................................. B65B 13/28
[52] U.S. Cl. ...................................... 100/31; 56/458; 100/8; 100/23; 100/33 R; 289/18.1
[58] Field of Search .............................. 100/8, 17–23, 100/29, 31, 33 R; 289/1.5, 17, 18.1; 140/93.6, 149, 118, 119, 122; 56/451, 457, 458

[56] References Cited
U.S. PATENT DOCUMENTS

| | | | |
|---|---|---|---|
| 496,647 | 5/1893 | Goodyear | 56/458 X |
| 659,792 | 10/1900 | Denny | 100/23 |
| 2,940,382 | 6/1960 | Hollyday | 100/21 |
| 4,178,845 | 12/1979 | De Gryse | 100/31 X |

Primary Examiner—Harvey C. Hornsby
Assistant Examiner—Stephen F. Gerrity

[57] ABSTRACT

This invention pertains to a tying mechanism applying twisting and winding of the two strands of the string or twine forming a closed loop around a bale or a package, until an overlapping and self-locking multiple-stranded configuration is achieved.

6 Claims, 1 Drawing Sheet

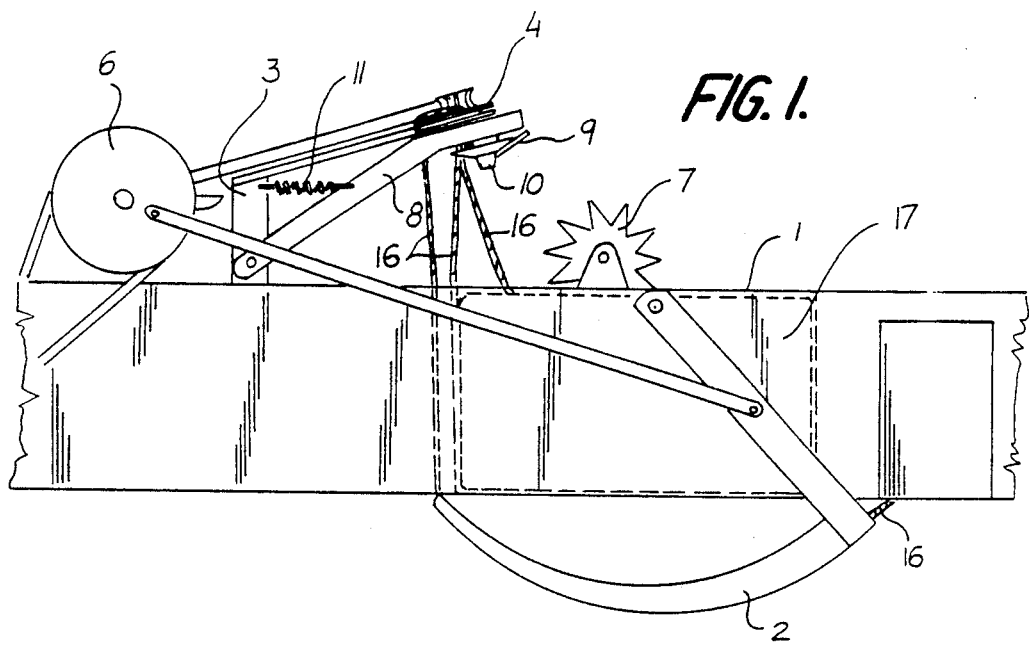
FIG. 1.
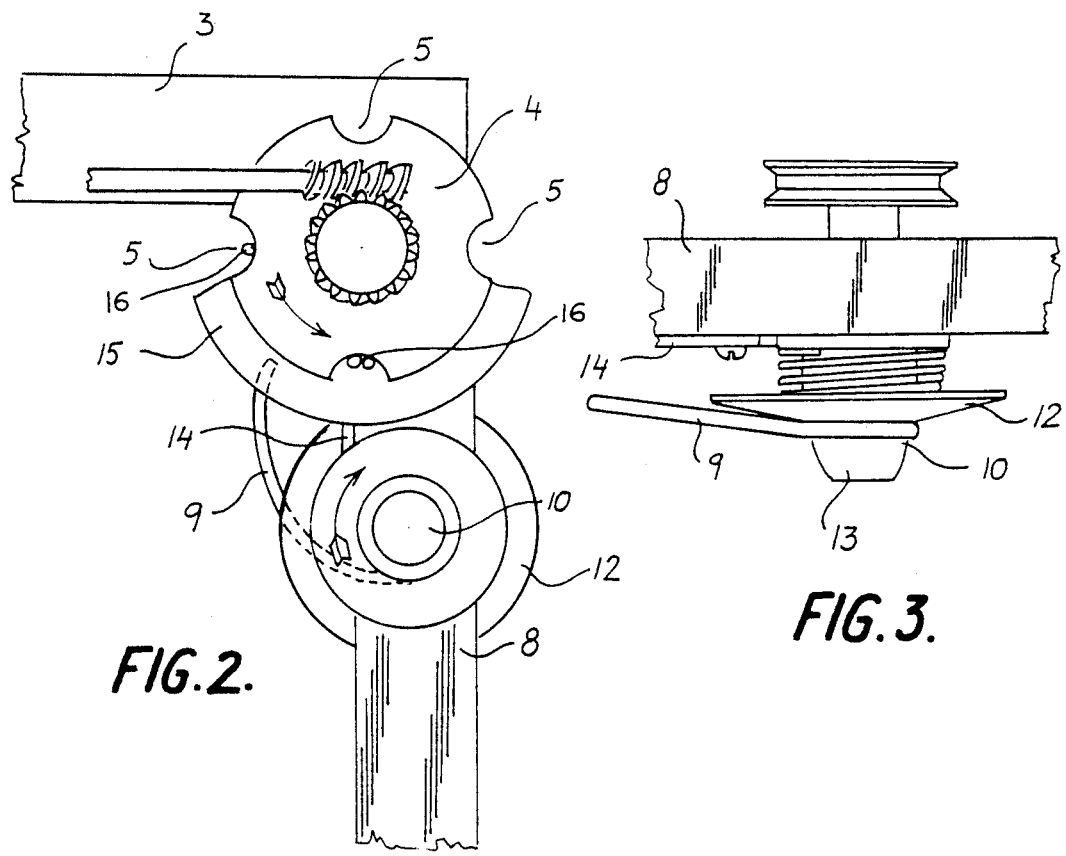
FIG. 2.
FIG. 3.

TYING MECHANISM

BACKGROUND OF THE INVENTION

In packaging agricultural fibrous crops, such as hay and straw, as well as in industrial packaging, strings or twines are often used to hold loose fibrous substances together for handling and transportion. In some applications, especially in agriculture the use of clamps to secure the strings around bales is undesirable, therefore, the ends of the strings forming the loops around bales are knotted together. There are several models of knotting devices, all of them applying the same basic process, by forming a loop of the string around a properly designed functional element, generally known in the industry as a "bill hook", and feeding the string through the loop to form a self-locking knot, which while being pulled off the bill hook becomes tight thereby securing the string around the package in a closed loop.

This knotting process requires a relatively complex mechanism with close manufacturing and operating tolerances, and calls for maintaining proper tension in the strings during the knot forming process. Excessive tension in the strings can result in making the knot too tight around the bill hook preventing its removal, thereby causing tying failure. Excessively loose strings may prevent their proper positioning for interaction with the operating components of the knotter. A rough or corroded surface on the bill hook also can effect the removal of the knot. Even air humidity can lead to problems by effecting the frictional relationships between the string and the bill hook. One of the principal shortcomings of this knotting process is that after the removal of the knot from the bill hook slack remains in the looped string around the package allowing the packaged substance to expand. This expansion reduces the density of the package that was achieved in the densification process. In order to maintain a desired final density the actual compressed density has to be higher, requiring additional energy input, causing increased stress in the apparatus. The expansion of the bale also can cause undesirable changes in its final shape.

It is, therefore, necessary to make improvements in the process of securing strings around such packages.

My invention applies a unique method that requires a simple mechanism, not calling for close operating tolerances, not being sensitive to the tension in the string, forming the self-locking knot directly on the string and not on any component of the mechanism, and making tightly wrapped loops around the bales or packages.

SUMMARY OF THE INVENTION

The method for securing strings or twines around bales or packages is the subject of my co-pending application Ser. No. 472,853 filed Jan. 31, 1990 (now U.S. Pat. No. 5,011,197). It discloses the securing of tightly wrapped loops around packages by applying twisting action on the two strands of the string forming a closed loop until the strands become twisted and wound together into an overlapping multistranded configuration with sufficient self-locking effect to prevent the reversal of the twisting process by the internal tensile forces in the string.

This application discloses the mechanism for the process.

The tying mechanism of my invention comprises two functional groups of components; the string delivery mechanism, and the twisting mechanism. The string delivery mechanism consists of; a container for holding a spool of string, a needle mechanism which places the string into a receiving element that holds the string in a closed loop around the package and delivers the strands of the string to the twisting mechanism. The above listed components of the delivery mechanism are common in the conventional knotting systems of hay balers, and can be directly adapted to my invention.

The twisting mechanism consists of a pivotally suspended frame, and a power driven rotary spindle that is bearing mounted on the frame.

The tying mechanism is positioned on the packaging or baling apparatus to complete the tying process while the package or bale is held under the compressive forces of the apparatus. The delivery mechanism is mounted on a stationary frame at a proper distance from the surface of the package on which the knot is to be formed, and it is also placed in proper relationship to the movement of the needle for the delivery of the string. The delivery mechanism receives power drive which is synchronized with the movement of the needle to receive the string and to deliver it to the twisting mechanism.

The twisting mechanism being pivotally suspended is allowed to move toward and away from the bale or package. The spindle receives rotary power drive. It has a radially extending stem made of flexible steel or other suitable material, and it is shaped to have the proper curvature to catch the strands of the string as they are being delivered by the delivery mechanism, and pull the strands toward the rotational axis of the spindle. The spindle also has a properly shaped flange which is forced against the radially extending stem. A stationary cutting knife is mounted on the frame of the twisting mechanism to cut the strings free from the delivery mechanism after being caught by the radially extending stem and being held firmly between the stem and the flange.

. The operation of the tying mechanism is as follows: the tying mechanism is mounted on the bale channel of a baler opposite to where the pointed end of the needle rests at its home position. The string is fed from the string container through the eye of the needle, pulled across the bale channel and is securely installed into the receiving component of the delivery mechanism. As the bale is being formed in the bale channel the string is pushed ahead by the bale placing the string on three sides of the bale. When the desired length of the bale is achieved the needle mechanism is activated by the bale length metering mechanism delivering two strands of the string across the bale channel to the delivery mechanism, one of the delivered strands completing the closed loop around the bale. While holding the three strands firmly the delivery mechanism delivers the two strands forming the closed loop around the bale to the work area of the radially extending stem of the twisting mechanism. The third strand remains held outside the work area of the stem for the next bale. During these events the needle returns to its home position. The two strands of the string being caught by the stem of the rotating spindle are pulled toward the rotational axis of the spindle and become pinched between the stem and the flange of the spindle. During the pulling action the two strands pass along the cutting edge of the knife cutting them free from the delivery mechanism. The pinched strands receive twisting action from the rotating spindle, winding and twisting them into a double strand. With the continued twisting action the actual length of the strands is reduced pulling the twisting mechanism toward the bale or package. As the twisting process continues the strands form a tightly wrapped loop around the bale, and an overlapping wrapping of the strands of the string develops forming a triple strand. After the twisting action is completed the strands are pulled free from the spindle. During this twisting process a certain tensile force has to be applied on the strands to achieve the desired self-locking tying effect. The tensile force is produced by an extension spring which tends to pull the pivotally supported frame away from the bale or package. With the release of the string from the spindle the spring force brings the frame of the twisting mechanism back to its home position next to the delivery mechanism.

The operation in a hay baler is continuous and the tying process is automatically repeated as the bale length metering mechanism activates the clutch which drives the needle and the tying mechanism.

BRIEF DESCRIPTION OF THE DRAWINGS

FIG. 1 is side view of the tying mechanism showing the relative positions of the delivery and twisting mechanisms in a conventional hay baler.

FIG. 2 is a schematic top elevation of the delivery and twisting mechanisms.

FIG. 3 is a schematic side elevation of the twisting mechanism.

PREFERRED EMBODIMENT

The tying mechanism is shown in FIG. 1, in a typical installation on a conventional baler making rectangular bales, as it is mounted on the top surface of the bale channel 1. The needle 2 together with its supporting hinged frame is shown on the bottom surface. The stationary frame 3 of the delivery mechanism is located such that the needle can deliver the string to the receiving component 4. The receiving component has several disks mounted on a common shaft, and each disk has four notches 5 in about 90° distribution. It also has a press arm 15 that exerts pressure on the string forcing it into the spaces between the disks, holding the string firmly through about a 180° rotation of the disks, after which the string is released. The disk assembly is power driven to perform a one-quarter revolution in synchronization with the movement of the needle, whereby the notches 5 are properly positioned to receive the string, and through the one-quarter turn deliver the two strands of the looped string 16 to the work area of the twisting mechanism. The synchronous action of the needle and the delivery mechanism is produced by the clutch 6 which controls both, and which is released by the bale length metering mechanism 7. The clutch, the bale length metering mechanism and the disk assembly are adapted from conventional balers. The frame of the twisting mechanism 8 is pivotally mounted on the bale channel, and it is positioned to allow the delivery mechanism 4 to deliver the captured string to the work area of the radially extending stem 9 of the spindle 10. The spindle 10 may receive continuous rotational drive, or it may be driven intermittently to produce the number of the necessary twistings or windings of the strings to form the self-locking tightly wrapped loop around the bale or package 17. The frame of the twisting mechanism 8 is held at its upper home position by a spring 11, which also exerts the necessary tensile force in the strings during the twisting action. The spindle 10 of the twisting mechanism is bearing supported. It has a properly dimensioned flange 12 which is forced flexibly against the stem 9. The compressive force between the flange 12 and the stem 9 is adjustable by moving the threaded nut 13 on the threaded portion of the spindle 10. The cutting edge of the knife 14 is positioned on the frame of the twisting mechanism to interact with the pulling action of the stem 9 on the string, thereby cutting the string free from the delivery mechanism 4.

While the preferred forms of the invention have been illustrated, and described, it should be understood that changes may be made without departing from the principles thereof. Accordingly, the invention is to be limited only by the literal interpretation of the claims appended hereto.

I claim:

1. A tying mechanism for tying strands of twine or string placed in tightly wrapped closed loops around bales or packages, the tying mechanism comprising:

a delivery mechanism and a twisting mechanism;

the delivery mechanism receiving and holding the strands placed in the closed loop and delivering the strands to the twisting mechanism;

the twisting mechanism including a journally mounted frame and a spindle assembly;

the spindle assembly having a rotational axis and being bearing supported on the journally mounted frame and receiving one of continuous or intermittent rotational power drive from a drive means;

the spindle assembly having a radially extending stem shaped to catch the strands delivered thereto by the delivery mechanism, and the stem pulling the captured strands toward the rotational axis of the spindle assembly upon rotation of the spindle assembly;

the spindle assembly having a flange, the flange and the radially extending stem being forced against one another by an adjustable flexible means thereby exerting a pinching force on the strands; and the adjustable flexible means releasably holding the strands between the flange and the stem.

2. The tying mechanism of claim 1, further comprising a cutting knife attached to the journally mounted frame, the cutting knife being positioned to cut the strands free from the delivery mechanism after the strands, being held between the flange and stem, are pulled toward the rotational axis of the spindle assembly.

3. The tying mechanism of claim 1, in which the twisting mechanism is held by a spring in an upper home position near the delivery mechanism.

4. The tying mechanism of claim 1, in which the twisting mechanism is movable between the delivery mechanism and the bale or package as the strands are being twisted.

5. The tying mechanism of claim 4, in which the twisting mechanism is resisted in its movement toward the bale or package by a spring holding the twisting mechanism in an upper home position near the delivery mechanism, the spring exerting a tensile force on the strands during the twisting action.

6. The tying mechanism of claim 1, wherein the strands forming the tightly closed loop are released from the spindle assembly after the completion of the twisting action.

* * * * *